United States Patent [19]
Byrd et al.

[11] 3,900,637
[45] Aug. 19, 1975

[54] COLLAPSABLE CHRISTMAS TREE APPARATUS

[76] Inventors: Charles F. Byrd, 1129 New Hampshire Ave., Washington, D.C. 20037; William Dailey, 36842 Weber, Sterling Heights, Mich. 48077

[22] Filed: Nov. 6, 1974

[21] Appl. No.: 521,313

[52] U.S. Cl.................................. 428/9; D29/1 A
[51] Int. Cl............................................ A47g 33/06
[58] Field of Search .......... 161/22, 24, 14; D29/1 A

[56] References Cited
UNITED STATES PATENTS

| | | | |
|---|---|---|---|
| 1,590,220 | 6/1926 | Wurts | 161/24 |
| 3,159,523 | 12/1964 | Abramson | 161/24 |
| 3,465,139 | 9/1969 | Siegal | 161/24 |

*Primary Examiner*—William E. Schulz
*Attorney, Agent, or Firm*—Behr and Woodbridge

[57] ABSTRACT

A collapsable, artificial Christmas tree type apparatus includes a plurality of rotatable limbs, an inner means, an outer means and a lever means for causing the rotation of the tree limbs relative to the inner and outer means. According to one embodiment the inner means comprises a rigid rod and the outer means comprises a tubular trunk which surrounds the rigid rod and which serves as a fulcrum for the rotatable tree limbs to rotate about. The base includes at least one leg which is associated with the inner and outer means in such a fashion as to cause the inner means to move parallel to the outer means when said lever means is caused to rotate. In this fashion, when the legs are folded down to form a base the tree limbs fall down into a natural attitude so as to simulate a real tree. The lever leg also includes a locking device to maintain the tree in an upright position during its display.

According to an alternative embodiment, the outer means comprises a plurality of parallel rods which form a parallelogram type linkage with respect to the inner rod. In a similar fashion, the manipulation of the leg lever means causes the artificial tree branches to rotate into either a closed or a folded position.

10 Claims, 8 Drawing Figures

PATENTED AUG 19 1975 3,900,637
SHEET 1 OF 2
FIG. 1  FIG. 2  FIG. 3
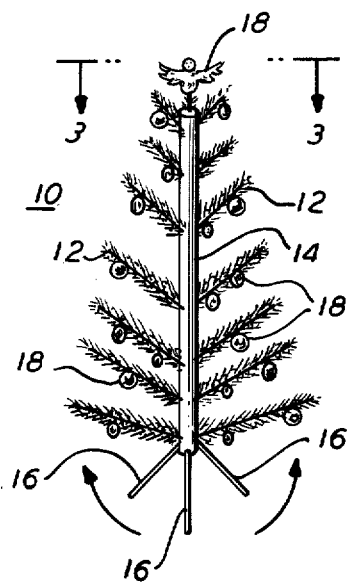
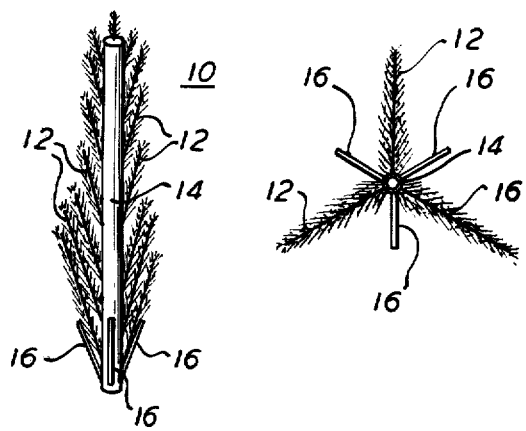
FIG. 7  FIG. 8
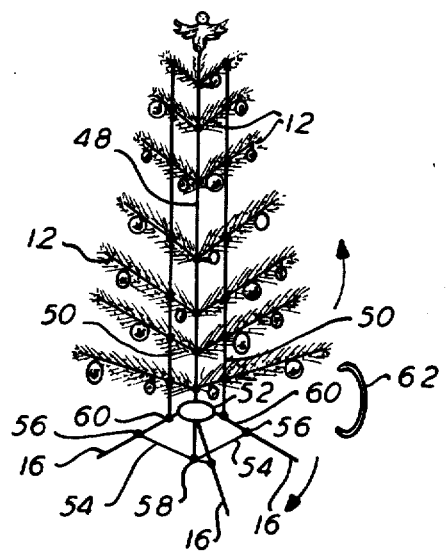
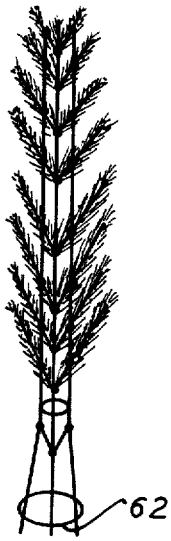

COLLAPSABLE CHRISTMAS TREE APPARATUS

BACKGROUND OF THE INVENTION

1. Field of the Invention

This invention relates to artificial trees and more specifically to an artificial christmas tree which may be erected or collapsed according to the movement of a leg member associated with its base.

2. Description of the Prior Art

There are several types of artificial trees well known to those of ordinary skill in the art. Wedden U.S. Pat. No. 2,708,324; Osswald et al., U.S. Pat. No. 3,030,720 and Hermanson, U.S. Pat. No. 3,639,196, all disclose collapsable artificial christmas trees having branches which rotate upwardly so as to reduce the bulk of the tree for storage purposes. Similarly, Hutton U.S. Pat. No. 2,988,837; Scherotto U.S. Pat. No. 3,020,660 and Blake U.S. Pat. No. 3,176,123, disclose artificial trees which may be readily erected and collapsed through the use of expanding or collapsing elements.

In contrast to the collapsable artificial trees, there are also a number of artificial shrubs and the like which include the use of plug-in branches. Trees of this sort, are disclosed in the Patents to Circelli, U.S. Pat. Nos. 3,746,600 and Strony 3,746,601. Circelli is of particular interest in that it discloses an artificial shrub in which the branches are pluged into hinged or rotatable sockets. In this fashion, a tube or other cylindrical container can be slipped around the christmas tree which causes the branches to rotate upward, thereby reducing the width of the tree and increasing the ease with which the tree may be stored. Finally, there is also the type of artificial tree, which is not truly collapsable, but instead may be knocked down or set up as a construction project. For example, see Carlson U.S. Pat. No. 3,031,785.

One of the major difficulties with the above described prior art is that the erection and collapsing of the artificial tree is a relatively major operation. Therefore, a means was sought which would allow the tree to be erected merely by the movement of a lever or the like. What is therefore desired, is an artificial tree that can be erected with the ease with which one opens an umbrella or erects a clothes line drying apparatus. For examples of prior art relative to those apparatus, see, for example, Beegle U.S. Pat. No. 1,075,395; Place et al., U.S. Pat. No. 2,269,317; Alexiou U.S. Pat. No. 3,038,690; Gray U.S. Pat. No. 3,069,021; O'Neil U.S. Pat. No. 3,091,249; Raynor U.S. Pat. No. 3,163,297 and Nugent U.S. Pat. No. 3,464,664.

It was in the context of the above described prior art, that the following apparatus was invented.

SUMMARY OF THE INVENTION

Briefly described, the present invention discloses an artificial christmas tree that may be erected or collapsed according to the movement of one of the leg base members.

According to one embodiment, the tree consists of an inner rigid rod member and outer tubular rod member that surrounds the inner member. A plurality of branches are rotatably connected to the outer tubular member and the bases of the branches are adapted to make contact with a tab member on the inner rod. A novel base means includes a leg lever device, which when rotated in one direction causes the inner rod to move relative to the outer tube. This causes the tab to impinge upon the base or shoulder of the branches and causes them to rotate toward an either full closed or full open position. The base leg lever includes a locking means for securing the tree in the full open or in the full closed position.

According to another embodiment of the present invention, the inner and outer means comprise parallel links and the branches of the tree form a parallelogram linkage with respect to the vertical means. In a manner similar to the first embodiment, the base means may be used to manipulate the inner and outer means so as to cause the branches to rotate into either the full closed or full locking position. Additionally, a locking mechanism may be included in the invention of the second embodiment so as to secure the tree in either the full open or full closed position.

These and other advantages of the present invention will be more fully understood in view of the following drawings.

BRIEF DESCRIPTION OF THE DRAWINGS

FIG. 1, is an elevated view of an artificial collapsable christmas tree, according to a first embodiment in which the tree is illustrated in the full open position.

FIG. 2, is an elevated view of the tree illustrated in FIG. 1, in which the tree is shown to be in the full closed position.

FIG. 3, is a top view of the embodiment shown in FIG. 1.

FIG. 7, is an elevated view of the present invention according to a second embodiment in which inner and outer members form a parallelogram type linkage. According to this view, the tree is shown to be in the full open position.

FIG. 8, illustrates the embodiment of FIG. 7, as shown in the full closed position

DETAILED DESCRIPTION OF THE INVENTION

Figure 4:
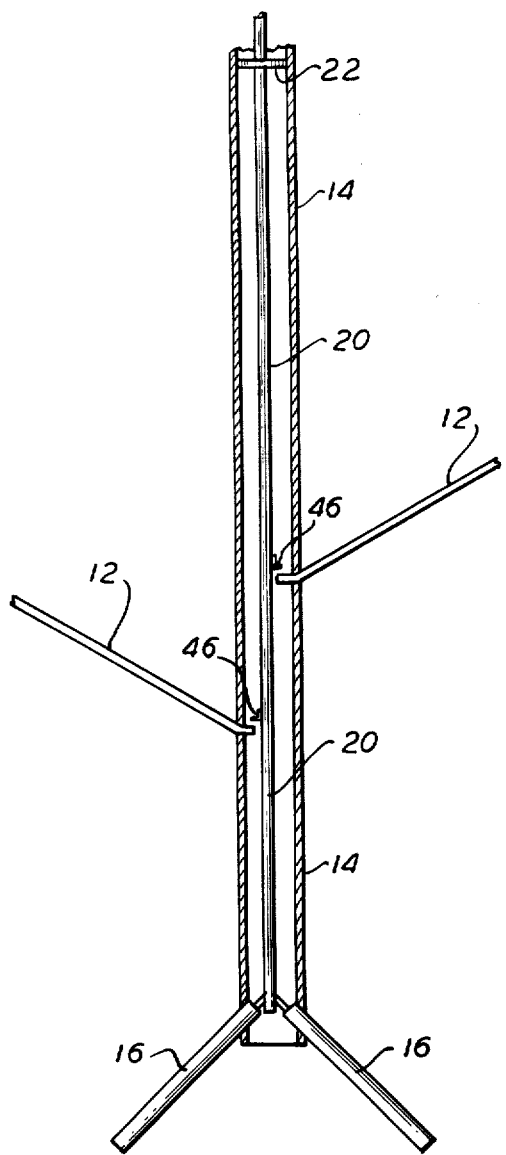
FIG. 4, is a partial cut-away or skeleton view of the tree, illustrated in FIG. 1.

During the course of this disclosure, it will be understood that like elements will be referred to with like numerals with reference to the different figures of the drawings.

A collapsable artificial christmas tree, according to a first embodiment of the present invention, is shown in various views in FIGS. 1 through 6. In FIG. 1, the artificial tree is shown in its full open position. According to that view, the artificial tree 10 includes a plurality of rotatable artificial tree limbs 12, a trunk 14 to which the limbs 12 are pivotally attached, and a base leg section 16 which supports the tree from underneath. For decorative purposes only, a plurality of ornaments are shown in association with the rotatable tree limbs 12 and on the top of the tree 10. According to this version of the first embodiment, three base legs 16 are shown. However, it will be appreciated from a further reading of the disclosure, that there can be more than three legs employed to support the tree. Obviously though, at least three legs are necessary to support such a structure.

When the tree of FIG. 1 is not being used for display purposes, then it is typically collapsed to its full folded position as shown in FIG. 2. In the full collapsed position, the legs 16 are rotated toward the top of the tree and at the same time the internal mechanism associated with trunk 14 causes the branches 12 to rotate inwardly. This, of course, greatly reduces the width of the tree and makes it much easier to store. The mechanism by which this folding is accomplished is disclosed in more detail in FIGS. 4-6.

A top view of the tree, as seen from prospective 3—3 on FIG. 1, may be seen in FIG. 3. According to FIG. 3, there are three rows of rotatable branches 12 and three individual leg members 16. The leg members 16 are shown as being off-set slightly from the rows of branches 12, but this is not necessarily the typical case. Base members 16 could be located at almost any arbitrary angle with respect to the rows of branches 12 as seen from this prospective. Also, it should be kept in mind that it is not necessary that the number of rows of branches 12 equal the number of feet 16. For instance, it may be desirable to have five or six rows of branches and only three or four sets of feet. The ratio of row branches to the number of feet is purely a matter of design expedient.

The folding and unfolding mechanism of the tree illustrated in FIGS. 1 through 3 may be better understood with reference to the detailed Figures in views 4-6. FIG. 4, which is a partial cross-sectional view of the embodiment shown in FIG. 1, shows in general detail the mechanisms more fully described in FIGS. 5 and 6. FIG. 4 is especially helpful in showing the relationships between the leg lever mechanism 16 and the rotatable branches 12. It is clear, from FIG. 4, that the branches 12 are associated with the leg lever 16 by an outer trunk 14 and an inner rigid rod 20. Trunk 14 is a tubular outer means which substantially completely surrounds an inner means 20, namely the inner center rod. As will be appreciated further on in this description, the articulation of lever legs 16, causes a relative motion between elements 14 and 20, that results in the folding or unfolding of rotatable branches 12. As shown in FIG. 4, the inner rod 20 is supported by one or more spacers 22, which serve to insure that rod 20 remains parallel to tubular trunk 14 during its relative motion therewith.

Figure 5:
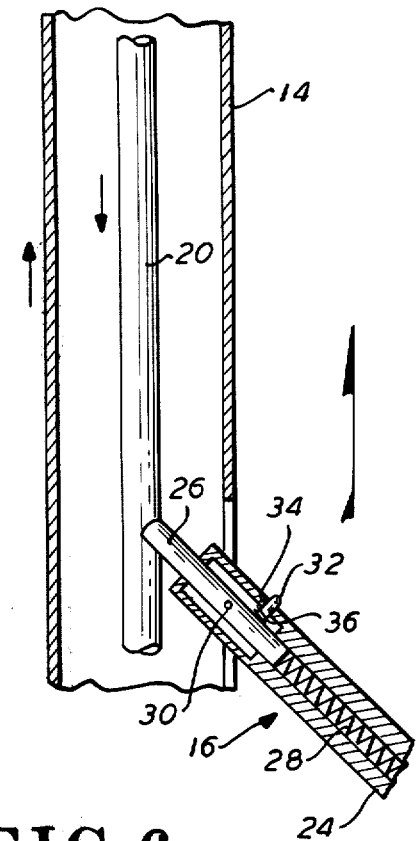
FIG. 5, is a detailed view of the leg lever section of FIG. 4.

A detailed drawing of the leg lever mechanism as generally shown in FIG. 4, may be seen in detail in FIG. 5. The leg lever mechanism comprises essentially a hollow leg means 24, a control rod 26, and a spring or spring means 28 for biasing the control rod 26 against the inner rigid rod 20. The hollow leg means 24 is pivotally attached to the outer trunk 14 and free to rotate about a pivot point 30. The end of control rod 26 furthest removed from biasing spring 28 is pivotally associated with center rod 20. That end of the rod may be either connected to center rod 20 by a hinge, a pivoting mechanism or it may just rest in a hole or detent in the rod in such a fashion that it can not escape during articulation. According to the embodiment of FIG. 5, rod 26 is shown as being received in a detent in rod 20, but it will be understood that there are a variety of other connecting modes that may be just as satisfactory. Rod 26 is kept firmly in the detent in rod 20 by means of the biasing spring 28. Also associated with leg mechanism 16 is a spring biased locking pin 32 which may be engaged in a detent hole 34, located in the hollow leg means 24. The biasing spring 36 associated with locking pin 32 may be seen also in FIG. 5. While spring 36 is shown as extending between control rod 26 and locking pin 32, it should be understood also that spring 36 could be located on the other side of the control rod 26, biasing both the control rod and the locking pin into the detent hole 34.

According to FIG. 5, the lever leg mechansim 16 is shown in the locked position. That is where the locking pin 32 extends through detent hole 34, and thereby prevents the relative movement of the control rod 26 and the inner and outer means 20 and 14. In order to cause elements 20 and 14 to move relative to one another, the locking pin 32 is depressed below the level of detent hole 34 and the leg 16 is rotated in the direction of the major arrow. This in turn causes the inner rigid rod means 20 to move downward relative to the upward movement of the outer tubular trunk means 14. During this motion, the tree transforms from its full open position, as shown in FIG. 1, towards its full closed position as shown in FIG. 2. In the full closed position as shown in FIG. 2, the ends of the legs will point substantially upward towards the top of the tree. In this case it may be desirable to add another detent hole in the hollow leg member 24, so that the leg may also be locked in its upward position. Of course, it will be noted that due to the geometry of this particular leg mechanism, the detent locking pin 32 will come into locking association with detent hole 34, at a second position, where it may either be locked or continued rotation may be preferred, if more compactness is desired.

Figure 6:
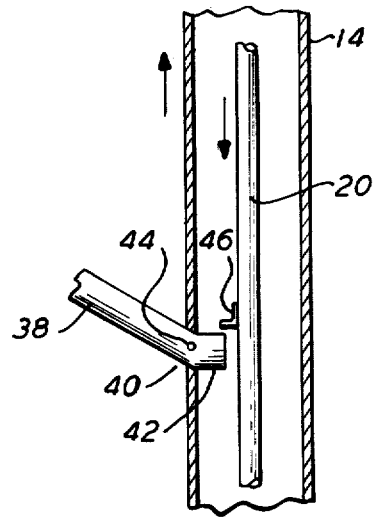
FIG. 6, is a detailed view of the branch mechanism illustrated in FIG. 4.

The consequences of rotation of the leg lever 16, will be more fully appreciated with reference to detailed FIG. 6. According to FIG. 6, the rotatable limb 16, is shown as including a free end 38 which might typically be decorated with artificial pine needle and the like, an intermediate pivoting section 40 and a base or shoulder end 42. The intermediate pivoting section 40 of limb 12 is pivotally attached to the outer tubular trunk means 14 in a manner similar to that of the attachment of hollow leg lever means 24 to trunk means 14. The point of rotation of the intermediate pivoting section 42 is shown as pivot point 44. In practice, a pin or other small rod would pass through pivot pount 44 and be anchored to trunk 14. It will be noted, of course, that the base end 42 lies relatively close to the intermediate pivoting section 40, whereas the free end 38 may extend quite a distance from the pivoting 40.

It is also clear from FIG. 6, that the center rigid rod means 20 includes a small tab section 46, which is situated in such a fashion as to abut the base or shoulder end 42 of branch 12.

In operation, the christmas tree 10 is erected or collapsed by the movement of leg lever 16. The erecting or collapsing of the tree may be accomplished by articulating leg lever 16 when the tree is held upright or conversely, it may be more desirable to turn the tree upside down and articulate the leg member 16. The reason why it may be more desirable to start with the christmas tree turned upside down, is that in this mode, the tabs 46 would not be working against gravity as will be more fully understood from the following.

When collapsing the tree, the tree begins in the full open position as shown in FIGS. 1 and 3 through 6. The detent locking pin 32, is pushed into the detent hole 34 and at the same time the leg lever 16 is rotated or articulated so as to cause the inner rod 20 to move downward relative to the upward motion of outer trunk 14. As seen in FIG. 6, the downward motion of rod 20 relative to the upward motion of trunk 14 causes the tab 46 to impinge upon the base or shoulder 42 of limb 12. Continued movement downward of rod 20 relative to trunk 14 causes the limb 12 to rotate about pivot point 40. As the limb 12 rotates about pivot point 40, the shoulder 42 drops lower, consequently raising the free end 38 of the limb, towards the upper portion of the tree. Continued rotation of limb 38 brings it into the fully closed position as shown in FIG. 2. As discussed previously, it may be desirable to perform the folding operation with the tree turned upside down since in this mode, the tabs will not be working against the force of gravity on the branches 12. Another detent in hollow means 24, may be used to secure the tree in the fully closed position.

In order to erect the tree from the fully closed position to the fully open position, the above described procedure is merely reversed. That is to say, the locking pin 32 is pushed into the detent hole and the leg lever 16 is rotated in the opposite direction so as to allow the branches 12 to fall towards their natural full open position. Obviously the erecting and collapsing operations are so simple that a child of tender years can years can do it free of supervision.

FIGS. 7 and 8 disclose a second embodiment of the invention broadly described with reference to FIGS. 1 through 6. The second embodiment of the present invention is similar to the first embodiment in that actuation of the leg lever means causes the branches 12 to assume a full open or full closed attitude. The mechanism of the second embodiment is also similar in that the relative motion between a vertical inner and a vertical outer means causes the rotation of the rotatable limbs.

FIG. 7 shows the artificial collapsable christmas tree of the present invention to comprise essentially a parallelogram type linkage which is associated with a collapsable base mechanism. The parallelogram type linkage includes a rigid vertical inner means 48 and a plurality of parallel vertical rigid outer means 50. The base 42 of each of the limbs 12, is pivotally connected to inner means 48. Likewise, the intermediate pivoting section 40, of each of the limbs 12, is pivotally or swivelly connected to one of the outer means 15. Inner means 48 and outer means 50 form a parallelogram type linkage with respect to one another, and it is obvious that the relative movement of 48 with respect to 50 will cause the rotatable tree limbs 12 to either assume a full open or a full closed position at the end of their travel.

The actuation of inner means 48, relative to the outer means 50 is accomplished through the manipulation of leg levers 16, in a manner similar to that described with reference to the first embodiment of FIGS. 1 through 6. The base mechanism of the second embodiment comprises leg levers 16, a guide ring 52 through which inner means 48 may slideably pass and a plurality of links 54. Base links 54 are pivotally attached at points 56 to one of the leg levers 16 respectively. The other end of link 54 is attached to a common support point 58, which supports the bottom of inner means 48. Base links 54 are pivotally attached at support point 58. Also attached to leg levers 16 are outer means 50, which are pivotally associated with element 16 at points 60. Points 60, are located somewheres intermediate pivot points 56 and the guide ring 62. As previously discussed, inner means 48 is free to slide up and down through guide ring 52.

In operation, the tree, according to the second embodiment is relatively simple to collapse and erect. For example, if one were to collapse the tree as shown in FIG. 7, then one merely rotates the leg levers 16 in the direction of the arrow shown, thereby causing as a reaction the folding of the limbs 12 in the direction also shown by the second arrow. After the legs are fully collapsed, the tree assumes the full closed position as illustrated in FIG. 8. In the full closed position, it may be desirable to lock the legs with a C-shaped clamp 62 or with any other suitable binder, such as a rubber band or string which will keep the legs and/or the limbs close together. In order to erect the tree, the collapsing operation is merely reversed. That is, the legs 16 are rotated in the opposite direction and the limbs thereafter after will fall towards their full open position. To understand the reason why the mechanism works as it does it is only necessary to inspect the linkage system itself. For instance, when the tree is collapsed and legs 16 are drawn in the direction of the arrow, the links 54 will cause the inner means 48 to move downward with respect to outer means 50. Since pivot points 60 are located closer to guard ring 62 than are pivot points 56 of links 54, then it is clear that inner means 48 will move down faster than outer means 50 and therefore inner means 48 will move downward relative to the relative movement upward of outer means 50. This movement obviously causes the branches 12, to assume their folded or substantially vertical attitude. Obviously, reversing the direction of leg 16 causes the inner means 48 to move upward relative to outer means 50 thereby causing the branches 12 to assume their open position.

In order to lock the tree of FIG. 7 in its full open position, it may be desirable to use C-clamp 62 between the guide ring 52 and the inner means support point 58. This will effectively assure that the tree stays erect because the inner means 48 will be restrained from movement relative to the outer means 50. While a locking means 62 has been described with respect to the second embodiment, as shown in FIGS. 7 and 8, it will be appreciated that due to the mechanics of the tree, a locking mechanism 62, may not be necessary in the full open position. Additionally, a variety of other locking means such as a locking pin 32 and detent hole 34 device could also be employed.

While specific embodiments of the invention have been described, it will be appreciated that certain modifications might be obvious to those of ordinary skill in the art. For instance, while a christmas tree, or the like has been described, it is clearly understood that artificial shrubs, bushes, or other arboreal plants could be simulated. Also, while the term Christmas is used within this disclosure, it will be appreciated that the same tree may be referred to as a Hanukah bush.

With respect to FIGS. 7 and 8 it will be fairly clear to those of ordinary skill in the art, that the number of tiers or rows of branches 12 will probably be equal to, or equal to a multiple of, the number of leg levers 16. Therefore, a top view of the tree of FIGS. 7 and 8 was omitted since its details would add little to the disclosure of this invention. This is in contrast to the embodiment disclosed in FIGS. 1 through 6, wherein the number of tiers or rows of branches 12 is essentially independent of the number of leg levers 16. Another difference between the embodiment of FIGS. 1 through 7 and the second embodiment in FIGS. 7 through 8 is that rotation of the leg levers 16 in one embodiment will cause closing, while rotation in the same direction in the other embodiment may cause opening. That is to say, in the first embodiment the leg levers 16 are rotated upwards in order to cause closing as shown in FIG. 2. Whereas, in the second embodiment the leg levers 16 are rotated downward in order to cause a full closed artificial tree as shown in FIG. 8.

In FIGS. 4 and 6, it is clearly illustrated that the collapsing or unfolding of the limbs 12 is controlled by the impingement of a tab 46 on the shoulder or base end 42 of the tree limb 12. While this approach may be satisfactory in many applications, it is believed that repeated manipulation of the arms may cause the tab 46 and/or the shoulder 42 to wear excessively. Escessive wear may undermine the effective use of the tabs 46. Therefore, an alternative approach would be to fasten the shoulder 42 directly to the inner rod 20 in a rotatable fashion. In other words, the shoulder 42 would be connected directly to rod 20 in a manner similar to that shown with respect to the second embodiment illustrated in FIGS. 7 and 8. While a direct, pivotal attachment between the shoulder 42 and the inner rod 20 is not illustrated in the drawings, it will be understood by those of ordinary skill in the art that such a modification is within the scope of the present invention.

While the invention has been particularly shown and described with reference to the preferred embodiments thereof, it will be understood by those skilled in the art that various changes in form and detail may be made therein without departing from the spirit and scope of the invention.

What is claimed is:

1. A collapsable artificial tree apparatus comprising:
   a plurality of rotatable tree limbs, each having a free end, an intermediate pivoting section and a base end;
   an inner means adapted to make contact with the base of said rotatable limbs;
   an outer means which runs substantially parallel to said inner means and which serves as a fulcrum to support the pivoting section of said rotatable tree limbs; and
   a lever means for causing said inner means to move in a direction parallel to said outer means, said lever means being adapted to contact both said inner means and said outer means during said movement,
   wherein the movement of said lever means in a first direction causes said rotatable tree limbs to rotate toward a folded position and movement of said lever means in an opposite second direction causes said limbs to rotate toward an open position.

2. The apparatus of claim 1 wherein said lever means constitutes a part of the base of said tree.

3. The apparatus of claim 1 wherein said lever means includes at least one leg of a tree base having a plurality of supporting legs.

4. The apparatus of claim 3 wherein said inner means comprises a rigid rod; and
   said outer means comprises a tubular trunk means which surrounds said inner rigid rod.

5. The apparatus of claim 4 wherein said lever means comprises:
   a hollow leg means pivotally attached to said outer tubular trunk means;
   a control rod pivotally associated at one end thereof with said inner rigid rod and held slightably captive at the other end thereof by the interior of said hollow leg means;
   a spring means for biasing said control rod against said inner rigid rod; and
   a locking means for immobolizing said control rod relative to said hollow leg means when said control rod is in a predetermined position relative to said hollow leg means.

6. The apparatus of claim 5 wherein said locking means comprises a spring biased locking pin on said control rod and a detent hole in said hollow leg means, wherein said lever means is locked when said pin means engages said detent hole and when said lever means may be unlocked by disengaging said pin from said detent hole and moving said leg means.

7. The apparatus of claim 6 wherein said inner means includes a plurality of tab means connected thereto, said tab means adapted to engage the base end of said rotatable tree limbs respectively and to provide folding and unfolding impetus to said limbs in response to the actuation of said lever means.

8. The apparatus of claim 2 wherein
   said inner means comprises a rigid central rod, said central rod being pivotally connected to the base end of said rotatable tree limbs respectively; and
   said outer means comprises a plurality of outer rods each pivotally attached to the intermediate pivoting section of said rotatable tree limbs respectively, said outer means thereby forming a parallelagram type linkage with respect to said inner means.

9. The apparatus of claim 8 wherein said lever means comprises a plurality of leg means each respectively pivotally attached to one of said outer rods, each of said leg means comprising a base and adapted for contact with a supporting floor and a top end attached to a ring member through which said rigid central rod may pass, said lever means further including a set of links each having one end attached pivotally to said leg means and the other end attached pivotally to said central rod.

10. The apparatus of claim 9 wherein said lever means further includes a means for locking said apparatus in the folded or unfolded position.

* * * * *